(12) United States Patent
Steeb et al.

(10) Patent No.: US 8,126,783 B2
(45) Date of Patent: Feb. 28, 2012

(54) RULE-BASED SHOPPING

(75) Inventors: Douglas Steeb, Trophy Club, TX (US); Taesik Sohn, Colleyville, TX (US)

(73) Assignee: Sabre Inc., Southlake, TX (US)

( * ) Notice: Subject to any disclaimer, the term of this patent is extended or adjusted under 35 U.S.C. 154(b) by 1278 days.

(21) Appl. No.: 11/539,317

(22) Filed: Oct. 6, 2006

(65) Prior Publication Data

US 2008/0086383 A1    Apr. 10, 2008

(51) Int. Cl.
*G06Q 30/00* (2006.01)
(52) U.S. Cl. ................................... 705/26.64
(58) Field of Classification Search .......... 705/26, 705/27, 26.64, 26.1, 27.1
See application file for complete search history.

(56) References Cited

U.S. PATENT DOCUMENTS

| | | |
|---|---|---|
| 6,263,323 B1 | 7/2001 | Baggett |
| 6,275,808 B1 | 8/2001 | DeMarcken |
| 6,295,521 B1 * | 9/2001 | DeMarcken et al. ............. 705/6 |
| 6,307,572 B1 | 10/2001 | DeMarcken et al. |
| 6,377,932 B1 | 4/2002 | DeMarcken |
| 6,381,578 B1 | 4/2002 | DeMarcken |
| 6,609,098 B1 | 8/2003 | DeMarcken |
| 2005/0228702 A1 * | 10/2005 | Fairbanks et al. .............. 705/5 |
| 2005/0273373 A1 * | 12/2005 | Walker et al. .................. 705/5 |
| 2007/0021989 A1 * | 1/2007 | de Marcken ................... 705/5 |

OTHER PUBLICATIONS

Kathryn Hayden, "Sabre Travel Network Announces New Generation of Tools for Shopping, Pricing and Managing Fares; Corporate and Leisure Suites Enhanced by New Foundational Elements, Allowing Better Access to GDS Content and Negotiated Rates," Sep. 11, 2006, Business Wire, p. 1.*

* cited by examiner

*Primary Examiner* — Jeffrey A Smith
*Assistant Examiner* — Brandy A Zukanovich
(74) *Attorney, Agent, or Firm* — Alston & Bird LLP

(57) ABSTRACT

A system, method, and computer-readable medium for generating an itinerary in response to a request from a user are provided. The system includes a memory for storing a market table associated with a respective market, a rule table comprising rules associated with a respective fare class, and a fare table comprising fares associated with each fare class within a respective rule table. Each market table includes rule identifiers corresponding to at least one connection path, and each rule table is associated with a rule identifier corresponding to one of the rule identifiers contained within a respective market table. The system also includes a processing element for determining whether criteria associated with each connection path satisfies the rules within a respective rule table and determining a fare from a respective fare table for at least one connection path corresponding to each fare class associated with the satisfied rules within a respective rule table.

32 Claims, 8 Drawing Sheets

RULE-BASED SHOPPING

BACKGROUND OF THE INVENTION

1) Field of the Invention

Embodiments of the present invention relate to shopping and, more particularly, to systems and methods for organizing and applying rules, fares, and scheduling to process travel-related shopping requests.

2) Description of Related Art

Reservation systems and Internet fare search engines use specialized techniques to review fare offerings, both published and unpublished (i.e., specially offered fares not normally available), across a number of different vendors (e.g., airlines, car rental companies, hotels, and the like) and return these results to the buyer in some ranked ordering based on the attributes the customer has requested, such as by price. Each travel vendor's system allows the fare search engines to determine which of their fares are available for the dates and itinerary being considered, and the fare search engines sort and select the best alternatives. The objective of traditional fare search processing is to find the best fare offers available in the marketplace.

However, processing air shopping requests is a difficult problem to solve efficiently and requires simultaneous scrutiny of many factors that span flight schedules, availability, published fares, rule restrictions, complex business logic, and carrier exceptions. The order in which the variables are analyzed has evolved with varying degrees of success while continuously emphasizing the need for more efficient techniques for processing requests. The looming competitive pressures that encompass temporal functionality, such as calendar shopping, continue to expand the search space, require additional resources, and decrease efficiency of air shopping.

One of the primary partitions of the business data is the vast array of fares and rules that describe the price of service across pieces of a huge market network with well described restrictions. Traditional thinking emphasizes a sequence of origination-destination objects formed from either schedules or fares. An inherent challenge to the shopping problem space is managing volumes of data objects that must be directly accessed, cross-referenced, or traversed to process a specific transaction. These tasks are not trivial and demand considerable effort in real-time, caching, and database persistence that ultimately ebb overall performance.

It would therefore be advantageous to provide techniques for organizing and applying rules, fares, and scheduling to more efficiently process air shopping requests. In addition, it would be advantageous to provide techniques for reducing the search space and eliminating duplicate effort to produce desirable itineraries.

BRIEF SUMMARY OF THE INVENTION

Embodiments of the present invention address the above needs and achieve other advantages by providing systems and methods for generating itineraries in response to requests from users. In particular, embodiments of the present invention utilize market, rule, and fare tables for organizing data hierarchically to facilitate the generation of itineraries in response to a request from a user. Generally, systems and methods according to one embodiment of the present invention utilize a market table to locate rule identifiers associated with respective rule tables based on criteria specified by a user. The criteria is also compared to the rules within the rule tables to locate valid fare classes so that fares and associated fare classes within the fare tables may then be located. Furthermore, embodiments of the present invention facilitate the combinability of a plurality of connection paths for those valid fare classes using pre-selected solution patterns and pricing unit tables so that fare tables may be combined for determining a fare for the complete journey. Thus, embodiments of the present invention are capable of generating a complete itinerary including an associated fare for an accumulated journey spanning one or more connection paths.

In one embodiment of the present invention, a system for generating an itinerary in response to a request from a user is provided. The system includes a memory for storing a market table associated with one or more markets (e.g., an airport origin-destination pair), at least one rule table comprising a plurality of rules (e.g., category-sequence rules) associated with a respective fare class, and at least one fare table comprising a plurality of fares associated with each fare class within a respective rule table. Each market table includes a plurality of rule identifiers corresponding to at least one connection path (e.g., at least one airport origin-destination pair), and each rule table is associated with a rule identifier corresponding to one of the rule identifiers contained within a respective market table. The system also includes at least one processing element configured to determine whether a user's requested criteria associated with each connection path satisfies each of the rules within a respective rule table. The processing element is also configured to determine a fare from the fare table for at least one connection path corresponding to each fare class associated with at least one satisfied rule within a respective rule table.

According to aspects of the system, the market table also includes a schedule summary for each connection path and mileage across each connection path. In addition, the memory may store at least one pricing unit table associated with a respective pricing unit, wherein the pricing unit comprises a round trip, a circle trip, an open jaw, or a one-way pricing unit. The processing element may combine a plurality of connection paths comprising a solution pattern of a sequence of pricing units, wherein each connection path is associated with a respective fare class. Furthermore, the processing element may determine the combinability of the connection paths for each fare class. The processing element may generate a priority queue for a plurality of combinations of connection paths based on a respective score associated with each fare class and determine a fare for each of the plurality of combinations of connection paths by combining a plurality of fare tables for each fare class based on the scores within the priority queue.

An additional aspect of the present invention provides a method and computer-readable medium for generating an itinerary in response to a request from a user. The method includes receiving at least one requested criteria (e.g., origin, destination, and dates of travel) for an itinerary from at least one user and generating a plurality of connection paths in response to the user's request. The method also includes determining whether the criteria satisfies a plurality of rules associated with each connection path and determining a fare for each connection path corresponding to each fare class associated with at least one satisfied rule.

Variations of the method include identifying a plurality of rule identifiers corresponding to each connection path based on the requested criteria, while the determining step may include determining whether the requested criteria satisfies a plurality of rules associated with each connection path for each rule identifier. Furthermore, the generating step could include generating at least one connection path using a shortest-path algorithm and a weighted multi-dimensional objective function. The method may include combining a plurality of connection paths comprising a solution pattern of a sequence of pricing units, wherein each connection path is associated with a respective fare class. The method could further include determining the combinability of the connection paths for each fare class, generating a priority queue for a plurality of combinations of connection paths based on a respective score associated with each fare class, and/or determining a fare for each of the combinations of connection paths by combining a plurality of fare tables each associated with a respective fare class based on the scores within the priority queue. The method may include accumulating journey selection criteria based on any remaining rules and then generating an itinerary for each of the combinations of connection paths based on the journey selection criteria.

An additional embodiment of the present invention includes a method for organizing data used to generate an itinerary in response to a request from a user. The method includes constructing at least one market table associated with one or more markets, wherein each market table comprises a plurality of rule identifiers corresponding to at least one connection path. The method also includes constructing at least one rule table comprising a plurality of rules associated with a respective fare class, wherein each rule table is associated with a rule identifier corresponding to one of the rule identifiers contained within a respective market table, and constructing at least one fare table comprising a plurality of fares associated with each fare class within a respective rule table.

According to various aspects of the method, constructing the market table includes accessing published fares, constructed fares, and/or industry fares, and/or determining a schedule summary for each connection path and/or mileage across each connection path within each market table. Moreover, the method could include constructing each market table for a plurality of airport origin-destination pairs and/or constructing the rule table to include a plurality of category-sequence rules associated with a respective fare class. The method may further include constructing at least one pricing unit table, wherein the pricing unit table is associated with a respective pricing unit for a plurality of rule identifiers within the market table, and wherein the pricing unit comprises a round trip, a circle trip, an open jaw, and/or a one-way pricing unit. In addition, the method may include constructing at least one component table, wherein each component table comprises scheduling information for each fare class associated with the at least one connection path.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
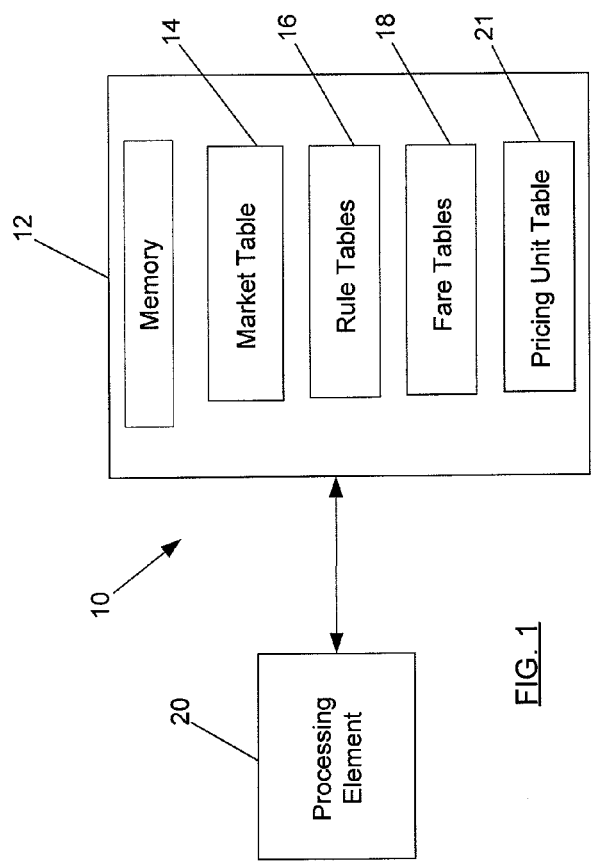
FIG. 1 illustrates a system according to one embodiment of the present invention.

Referring to the drawings and, in particular, FIG. 1, a system 10 for generating an itinerary in response to a request from a user is shown. The system 10 generally includes a memory 12 for storing a market table 14, a rule table 16, and a fare table 18. One or more processing elements 20 are capable of receiving requests from users for itineraries and accessing the memory 12 to generate one or more itineraries satisfying the users' requests.

As explained in further detail below, the root key to a collection of rules and fares within a rule table 16 and a fare table 18, respectively, is generally a composite of vendor, rule-tariff, carrier, and rule-number known as a VTCR. A rule table 16 associates specific restrictions, known as category-sequences, to specific fare-classes. The fares are tabulated in a fare table 18 for a given fare-class within a rule table 16. This hierarchy may efficiently eliminate significant numbers of fares from the fare search space with virtual independence from a particular market. Thus, the organization of data within the memory 12 facilitates a rule-based approach to processing users' requests in a more efficient manner and may require less computing resources than conventional techniques. Although denominated as tables throughout, the market table, rule table, and fare table need not necessarily be organized or structured in a traditional tabular manner, such as in an n×m array of contiguous memory locations. Instead, the tables are intended to more broadly refer to any database or memory organizational structure from which associations between different elements can be drawn, such as between category-sequences and fare-classes in a rule table or between fares and fare classes in the fare table.

Figure 2:
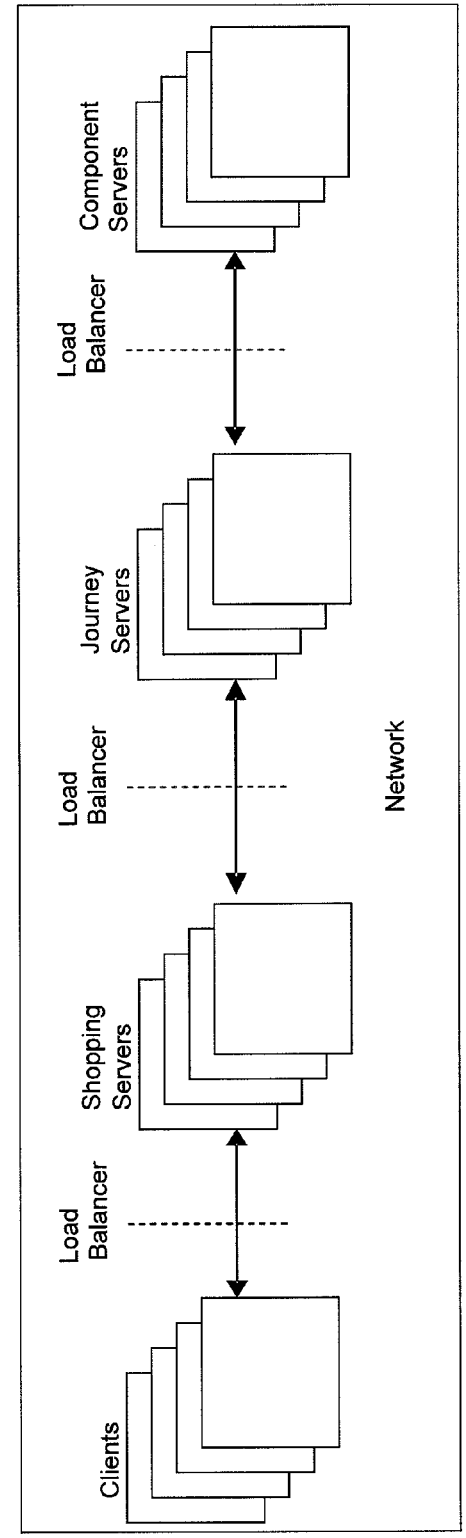
FIG. 2 illustrates a client-server network according to one embodiment of the present invention.

Referring now to the drawings and, in particular to FIG. 2 there is shown a network, wherein a plurality of servers and clients communicate through a network. For instance, clients may communicate with servers to obtain fare and availability information for a requested itinerary. Although reference is made herein to the airline industry, such reference is exemplary only, as the invention is applicable to various travel-related industries. For instance, embodiments of the present invention are applicable to various travel industries such as aircraft, automobile rental, rail, hotel, and the like, wherein various constraints may be associated with fares. As used herein, fares shall refer to any pricing information, be it in the context of air fares, car rental fees, etc.

The system 10 generates one or more itineraries in response to requests from users, where an itinerary corresponds to a proposed route of travel. As such, the term "itinerary" is not meant to be limiting and is applicable to any number of travel industries, such as those discussed above, and would include various travel plans for a specified route, which route could include only a single city in the context of an automobile rental or hotel reservation. In addition, each itinerary has one or more criteria associated therewith. For instance, the criteria could be origin and destination locations (O/D), dates, scheduling, fare classes for an airline flight, and service quality.

As referred to herein, the terms "client" and "server" are generally used to refer to a computer's role as a requester of data (i.e., the client) and a provider of data (i.e., the server). The client and server may communicate via a communication network, such as the Internet, an intranet, an extranet, or any other suitable network. As also used herein, the term "client" corresponds to any suitable computing device, typically a computer, a personal data assistant, mobile phone, or the like, capable of communicating with a server. Likewise, the server is generally comprised of a processing element such as a computing device having at least one or more processors and associated memory device(s) as known to those skilled in the art. The client and server may comprise any number of conventional components but typically include a bus, central processing unit (CPU), read-only memory (ROM), random access memory (RAM), storage device, input/output controller, and network interface, and may operate at least partially under the control of one or more software programs or other applications, as all known to those skilled in the art. According to one embodiment, the server may include an object-oriented database, such as those provided by Versant Corporation. Any number of clients and servers may be included in the system and communicate with one another. For example, FIG. 2 illustrates that there may be a plurality of clients and servers that are capable of communicating with one another. Load balancers may be employed to distribute processing and communications activity evenly across the network.

As indicated above, the VTCR may be the root key for processing requests for itineraries from users. The "V" in VTCR corresponds to "vendor," such as the Airline Tariff Publishing Company (ATPCO); the "T" in VTCR corresponds to a tariff number associated with representative geographic regions (e.g., 11 or 245); the "C" in VTCR corresponds to a carrier code (e.g., AA or American Airlines); and the "R" in VTCR corresponds to an alphanumeric rule number (e.g., 2000 or 3035). Vendors, such as ATPCO, compile all the new and changed fare records received from the respective airlines into a master database, and this updated information is subsequently distributed to all the subscribing airlines and global distribution systems ("GDS's") worldwide. The GDS's are the systems used by travel agencies to check flights, fares, and availability and to make travel bookings. Vendors provide the fare information in a common data format such that various pricing tasks may be uniformly performed. Although the term VTCR is used herein as applicable to the airline industry, it is understood that similar roots keys may be constructed for other travel industries.

Figure 3:
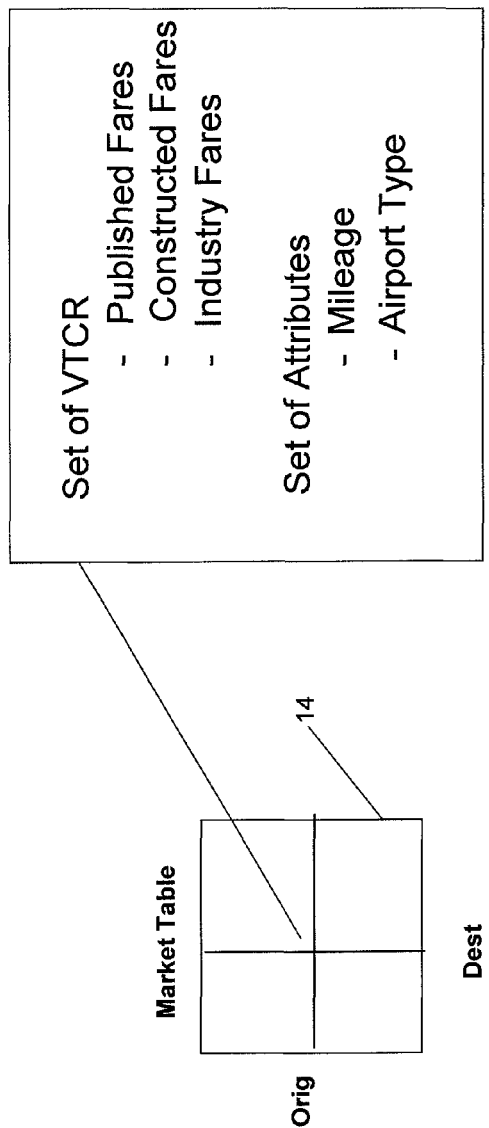
FIG. 3 illustrates a market table according to an embodiment of the present invention.

As shown in FIG. 3, the market table 14 includes a plurality of VTCR's that correspond to a plurality of markets. The market table 14 is constructed based on published VTCR information for every local (i.e., one flight segment) and thru market (i.e., one or more flight segments) based on published, constructed, and industry fares. Thus, the market table 14 is built and maintained based on fare information. The market table 14 may include various information, such as a schedule summary and mileage across origination-destination pairs. The data structure within the market table 14 may be populated from individual fare records that contain rule-tariff and origination-destination fields. This matrix facilitates the generation of market paths with consideration to service, mileage, and other factors. In effect, the market paths produced for a given travel request samples the constraint space and accumulates the root keys, e.g., the VTCR's.

Figure 4:
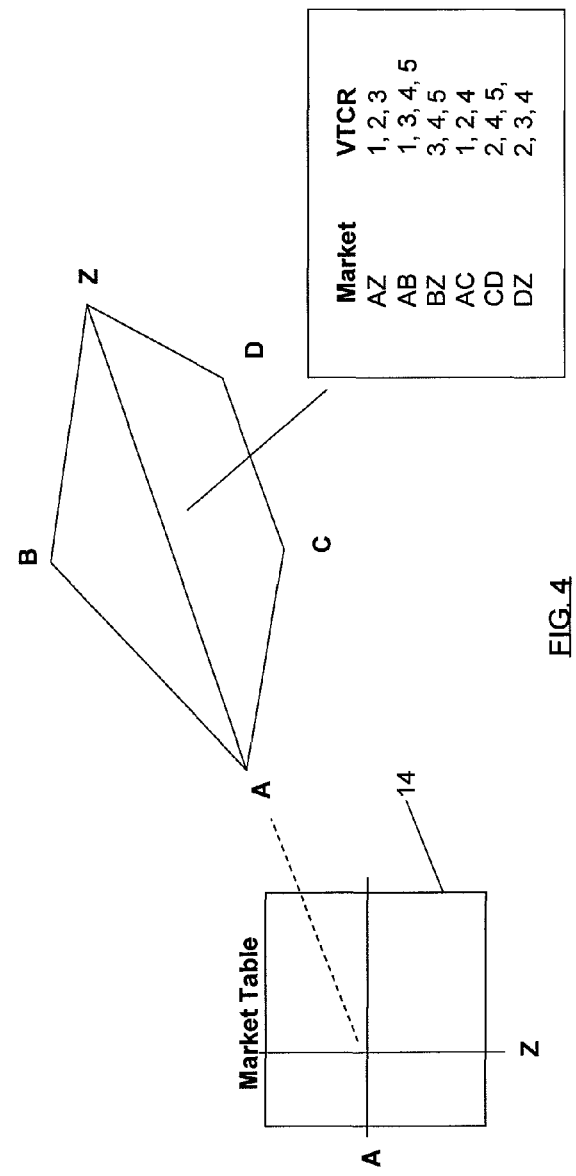
FIG. 4 depicts a market table and exemplary connection paths generated therefrom according to one embodiment of the present invention.

With respect to the airline industry, a market corresponds to an airport origin-destination pair, where each market may include a plurality of connection paths. FIG. 4 demonstrates that each market (i.e., AZ) may include one or more connection paths spanning the market (e.g., AB and BZ), and each connection path may include any number of associated VTCR's. Thus, an itinerary may include one or more connection paths, where each connection path corresponds to a particular origin-destination pair. A complete collection of connection paths for a particular O/D is typically termed a journey. For instance, a user requesting a flight from Dallas to Charlotte will correspond to a market of DFW-CLT, as well as any connection paths between DFW-CLT, such as DFW-ATL and ATL-CLT to define the complete journey.

Figures 5, 6:
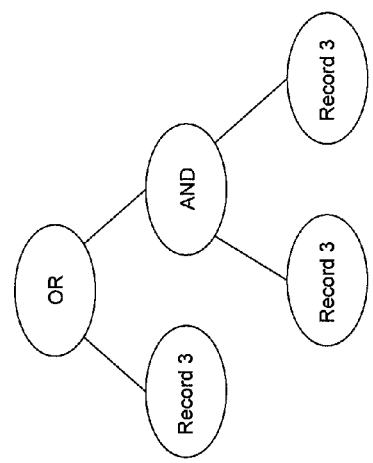
FIG. 5 illustrates a rule table according to an embodiment of the present invention.
FIG. 6 shows a category rule sequence string according to one embodiment of the present invention.

Each VTCR within a market table 14 may be used as a root key for a rule table 16. The purpose of the data structure within the rule table 16 is to provide the association of category-rules to specific fare classes, as shown in FIG. 5. Each rule table 16 is built and maintained based on a particular VTCR and associated category rules and fare classes. For example, Category 1 corresponds to Eligibility, Category 2 corresponds to Day of Week, Category 3 corresponds to Seasons, Category 5 corresponds to Advanced Purchase, Category 6 corresponds to Minimum Stay, Category 7 corresponds to Maximum Stay, Category 9 corresponds to Transfers, Category 11 corresponds to Blackouts, Category 14 corresponds to Travel Restrictions, and Category 15 corresponds to Sales Restrictions. Thus, a rule associated with a VTCR that corresponds to a connection path generated in response to a user's request could be any number of rules, such as fare class X is only valid on Tuesday before noon.

Categories within each rule table 16 are typically organized as a rule tree. As known to those skilled in the art, ATPCO includes a plurality of Record 3s (R3s) for each Record 2 (R2), where the R3s are organized as a sequence string of rule fragments in a rule tree for each R2. For example, the category rule sequence string may be represented as a binary predicate tree where the terminal nodes are the R3s that are evaluation functions, as shown in FIG. 6. Thus, each column in the rule table 16 defines the category sequence rules, which are utilized to determine the relationship with fares in the context of fare-classes represented as rows in the rule table. For example, the column in the rule table 16 may include R2 sequences for each category rule. This data organization allows each category-rule to be processed only once, which reduces computational resources and increases efficiency. For example, a user submitting an itinerary request will include one or more criteria that corresponds to one or more respective rules (e.g., minimum stay) such that the request can be filtered based on whether the rules are satisfied rather than first generating an itinerary and associated fares satisfying the user's request and then analyzing the rules for the generated itinerary. Moreover, dates submitted with the user's request may be used to eliminate VTCRs such that the rule table 16 may also include date information. A Category 25 rule table may also be employed, which includes rules corresponding to discount fares. For instance, a user may be entitled to a discount fare that is lower than a published fare (e.g., a corporate discount), wherein a triggering mechanism is used to access the Category 25 rule table when an applicable rule associated with the user is present.

Like the VTCR to rule table 16 relationship, a fare-class may be the primary key to a fare table 18 within the scope of a rule table. The fare table 18 is generally a collection of fares with corresponding markets and amounts. The fare table 18 is also built and maintained based on changing fare information associated with each fare class. The fare table 18 typically only includes published fare information. The logical organization of the data elements demonstrates the path of refinement from the VTCR, through the rule tables 16, and then the fare tables 18 to full resolution of the markets, schedules, and ultimately priced itineraries for a typical shopping problem. For example, a user may submit an itinerary request including one or more criteria that corresponds to one or more respective rules. If the requested criteria satisfies one or more rules within the rule table 16 for a particular VTCR, the corresponding fare class is used to identify a particular fare within the fare table 18. Conversely, any fare classes that correspond to category rules within the rule table 16 are eliminated such that only those fare classes corresponding to a satisfied category rule will be further analyzed.

It is understood that the aforementioned discussion of the market table 14, rule tables 16, and fare tables 18 is not meant to be limiting, as each table could include various information in various formats. As indicated above, the market, rule, and fare tables may be used in conjunction with various travel industries such that each of the market, rule, and fare tables may contain information specific to each travel industry and be organized in the same general hierarchy. In addition, the market table 14 generally includes a plurality of VTCR's that correspond to a particular market, but may include other information, such as mileage, scheduling, and service level. Moreover, the mileage data (e.g., latitude and longitude) and scheduling data used to generate connection paths could be included in separate databases and be in communication with the market table. In addition, the rule table 16 generally includes category-sequence rules and corresponding fare classes. The rule table 16 could include one or more specific category-sequence rules (e.g., Categories 1, 2, 3, 5, 6, 7, 11, 14, and 15) to parse out one or more fare classes (e.g., first class, business, coach, etc.). Furthermore, the fare table 18 could include fares for respective markets and/or connection paths that correspond to a fare class within the rule table 16. In addition, each of the market 14, rule 16, and/or fare 18 tables may be updated such that old data may be purged and updated data added to a respective table. Thus, available memory may be increased, while unnecessary processing of outdated data may be eliminated. Moreover, the market 14, rule 16, and/or fare 18 tables could provide feedback to help guide future requests from users. For instance, the market table 14 could manage a history of solution patterns that produce itineraries satisfying users' requests as a guide for generating future solutions.

Figure 7:
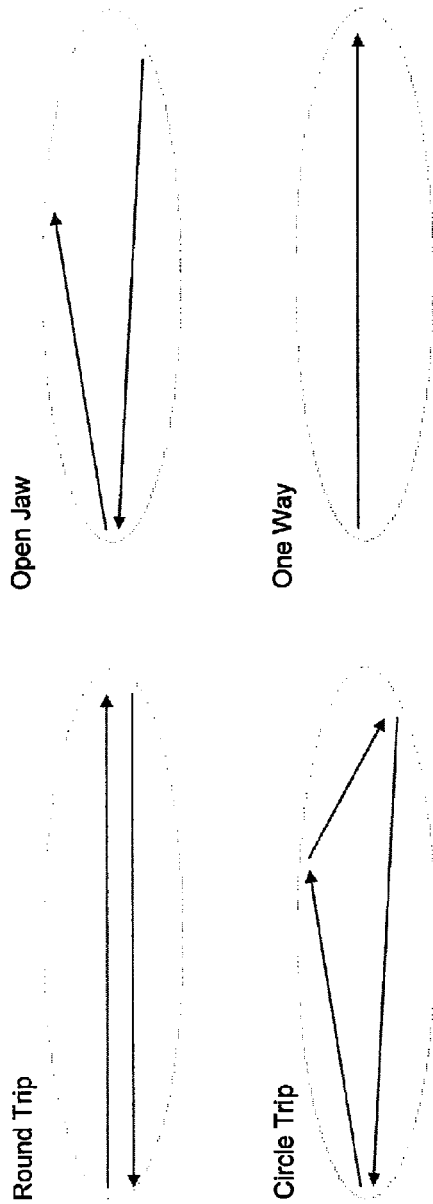
FIG. 7 illustrates exemplary pricing units according to an embodiment of the present invention.

Fares can be encapsulated into various pricing unit types such as round trip, open jaw, circle trip, and one way. As shown in FIG. 7, a round trip pricing unit includes a direct connection between an O/D for the departure and return segments. The open jaw pricing unit includes a departure segment and at least one additional segment, but the final segment does not return to the origin location. In addition, the circle trip pricing unit includes a departure segment and a plurality of additional segments, with the final segment returning to the origin location. The one-way pricing unit includes a single O/D. With predefined pricing unit types, fixing the sequence of pricing units up front reduces the overall complexity and facilitates fare combinability.

Figure 8:
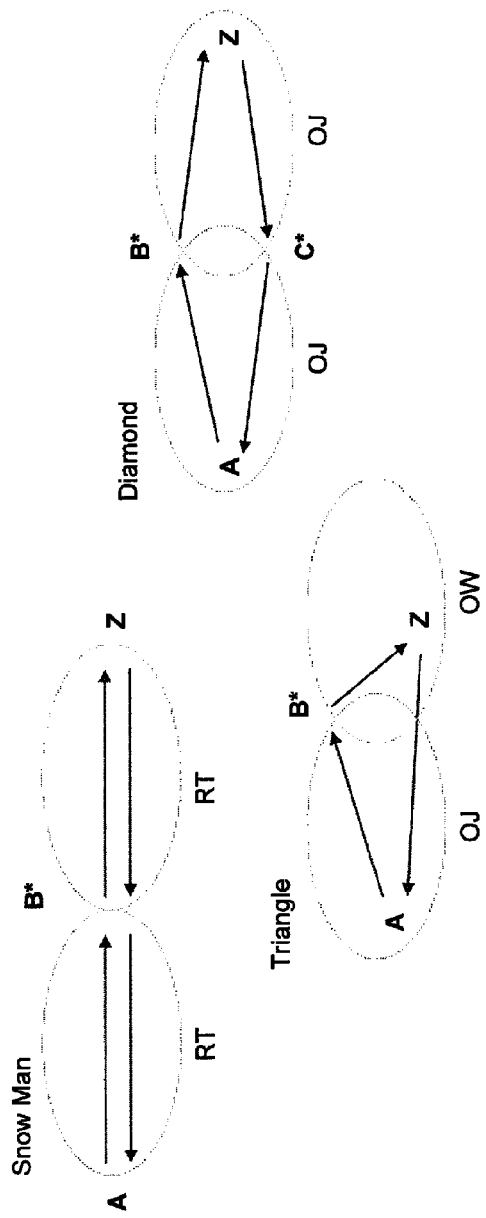
FIG. 8 depicts exemplary solution patterns according to one embodiment of the present invention.

A combination of pricing units defines a solution pattern, such as those shown in FIG. 8. For instance, a "snow man" solution pattern includes a pair of roundtrip pricing units; a "diamond" solution pattern includes a pair of open jaw pricing units; and a triangle solution pattern includes an open jaw pricing unit and a one-way pricing unit. Thus, a solution pattern encapsulates all of the fares describing a journey (i.e., a plurality of connection paths) and fixes the hierarchy of constraints for producing solutions. In this regard, the highest order of constraints is driven by the pricing unit types that group the fares that span the journey. In other words, the fares are grouped into pricing units, and the pricing units are grouped into solution patterns.

The number of fare combinations to be considered for processing a typical request is large. The number of combinations can be balanced when valid fare-classes are framed in a specific type of pricing unit for a solution pattern of interest. In other words, by only considering those fare classes for VTCR's that are combinable across one or more pricing units, the number of VTCR combinations may be reduced. In general, the category-sequence rules define primarily what VTCR's (i.e., rule-tariffs, carriers, and rule-numbers) may be combined for pricing purposes. Thus, combinability rules generally focus on whether fares from specific VTCR pairs are combinable or fares from specific fare classes contained in a VTCR are combinable. These restrictions may reduce the problem space, and when sequenced properly, may aid the computational efficiency. The number of solutions explored can be adjusted to generate responses for complex trip (i.e., two or more destinations), alternate dates, calendar (i.e., range of dates), and alternate destination shopping. For example, the total number of pricing units may be limited (e.g., single round-trip pricing unit, through fare); the type or combination of pricing units may be limited (e.g., two round-trip pricing units, snow man, or open jaw plus one way, triangle); the number of destinations may be limited; and/or the date ranges may be limited.

Figure 9:
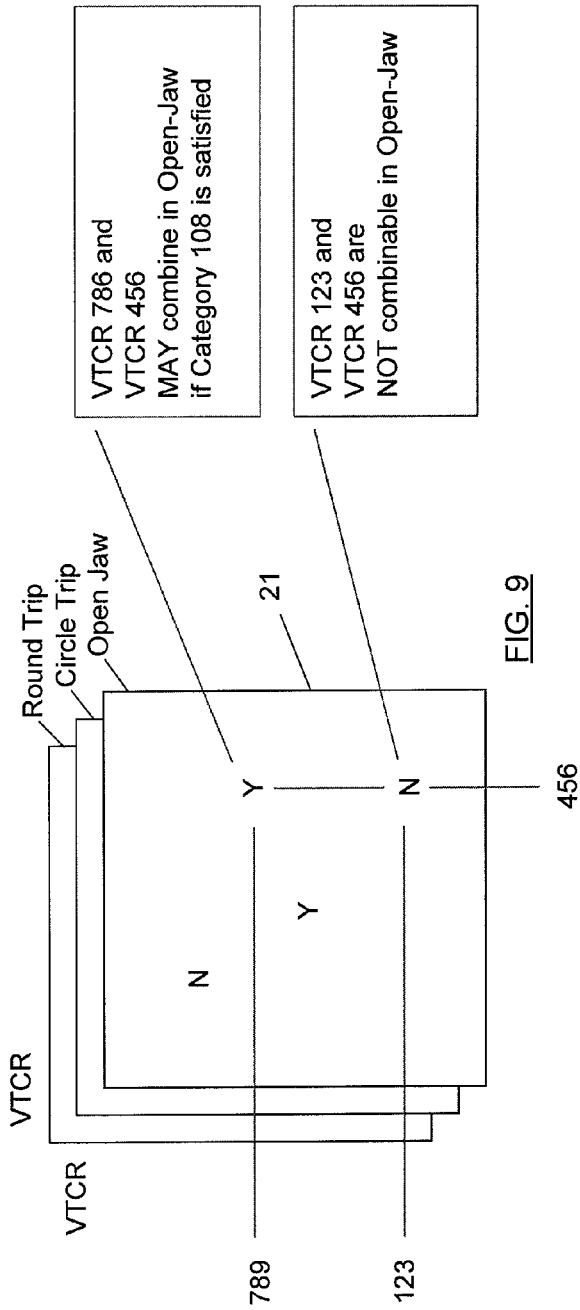
FIGS. 9 and 10 illustrate exemplary pricing unit tables according to an additional embodiment of the present invention.
Figure 10:
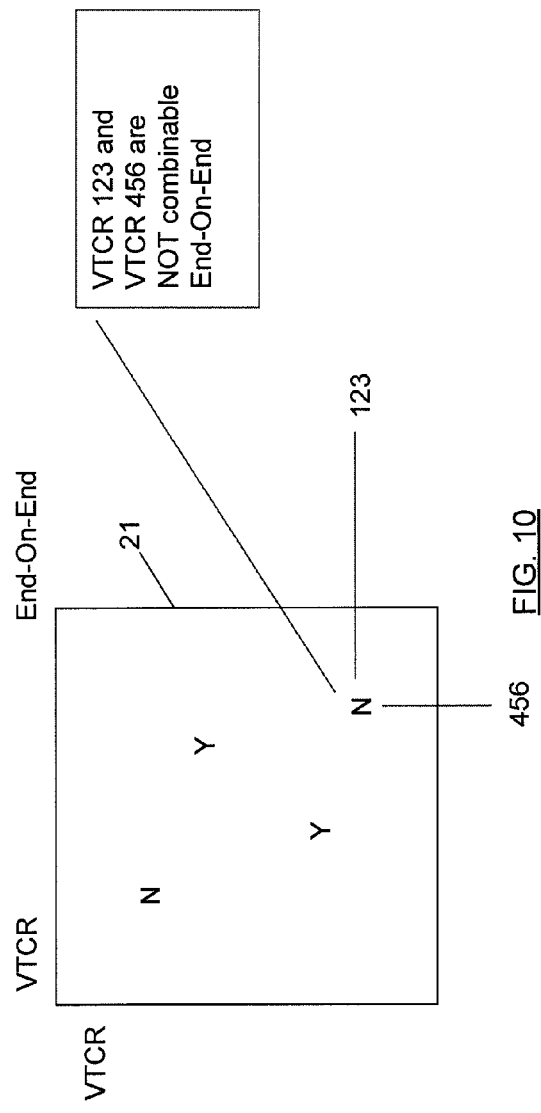

In this regard, the system 10 employs pricing unit tables 21 to determine the combinability of VTCR's within and across pricing unit types, as shown in FIGS. 9 and 10. Generally, the pricing unit tables 21 facilitate the determination of which rule tables 16 are combinable and eliminate VTCR pairs that will never combine with one another (i.e., "hard failure"). More specifically, the combinability of VTCR's is determined within pricing unit types (e.g., round trip, circle trip, open jaw) by evaluating the carrier (Category 106) and the rule/tariff (Category 107) of each VTCR for a specific type of pricing unit. A Category 106 rule may specify a set of carriers that a specific VTCR is combinable. For example, VTCR (ATP 123 XY 6789) is compatible with Carriers AB, CD, and EF. A Category 107 rule may specify a set of tariffs and/or rule numbers that a specific VTCR is combinable. For example, VTCR (ATP 123 XY 6789) is compatible with Tariff 11, 88, and 245. Thus, the combinability of VTCR's may be determined in the absence of any specific fare, market, and/or scheduling information. The combinability of VTCR's is typically performed on a fare class basis (Category 108) after determining those VTCR's that span the connection paths that are generated in response to a user's request. For example, FIG. 9 demonstrates that VTCR 786 and VTCR 456 are combinable in open jaw if Category 108 is satisfied. In this regard, a Category 108 rule may specify a set of fare classes that a specific VTCR is combinable. For example VTCR (ATP 123 XY 6789) is compatible with fare classes YLAP14 and YLAP21. Furthermore, the system 10 can determine the combinability across pricing unit types in the absence of any specific fare, market, and scheduling information by evaluating end-on-end constraints (Category 104). Category 104 address fare combinability across specific pricing unit instances. For example, VTCR (ATP 123 XY 6789) is combinable end-on-end with VTCR (ATP 456 AB 2468). Thus, combining VTCR's across pricing units corresponds to combining more than one pricing unit (e.g., a plurality of one-way pricing units). For instance, FIG. 10 shows that VTCR 123 and VTCR 456 are not combinable end-on-end based on the end-on-end constraints for each VTCR.

Once the combinability of VTCR's is determined, a scan of the combinable VTCR's within respective rule tables 16 is performed that corresponds to the remaining rules associated with each unique rule table. Be evaluating category rules, such as eligibility, day-of-week, seasons, advanced purchase, and blackouts, a set of valid fare classes can be extracted from each rule table 16. A generic score is typically applied to each valid fare class (i.e., those fare classes associated with rules satisfied within the rule tables 16) based on the minimum fare (e.g., published, private, and Category 35 fare) associated with each fare class in the fare tables 18. For example, a first fare class may receive a higher score because it includes lower priced fares, while a second fare class may receive a lower score because it includes higher priced fares. Based on the scores, a priority queue corresponding to a ranking of a sum of the fare class scores for a combination of connection paths is constructed that contains fare class combinations for each desired solution pattern. Thus, the fare class scores may be prioritized based on a descending order of highest to lowest scores. For example, each fare class for a given VTCR may be scored by the lowest published fare associated to it. In particular, each fare class contains a set of fares that specify the origination, destination, and amount. The priority of a fare class may be set by the lowest fare amount contained within the collection. Moreover, the fare tables 18 may be expanded for the valid fare classes by computing constructed fares, Category 25 fares, and Category 35 fares. Not all fares are published. Thus, many fares are computed 'on the fly' through Category 25, fare-by-rule strategies, and Category 35, discounted fares. The results of Category 25 and 35 computations may be stored in the fare tables for reuse across requests and may be used to adjust the score of the particular fare class (e.g., reduce the score by multiplying the Category 25 discount for the applicable fare class).

Furthermore, a priority queue may be generated for each carrier, interline (i.e., multiple carriers), and/or other category. For example, the priority queue may seed a priority queue based on each carrier per solution pattern, wherein the solution patterns may be accessed from the market table 14. Initially, each score may have the lowest fare associated with a VTCR and fare class because many factors, such as geography, have not been considered up to this point. The priority queue may be expanded from a solution pattern level to a VTCR level, as indicated above by determining the combinability for VTCRs for various solution patterns.

Figure 11:
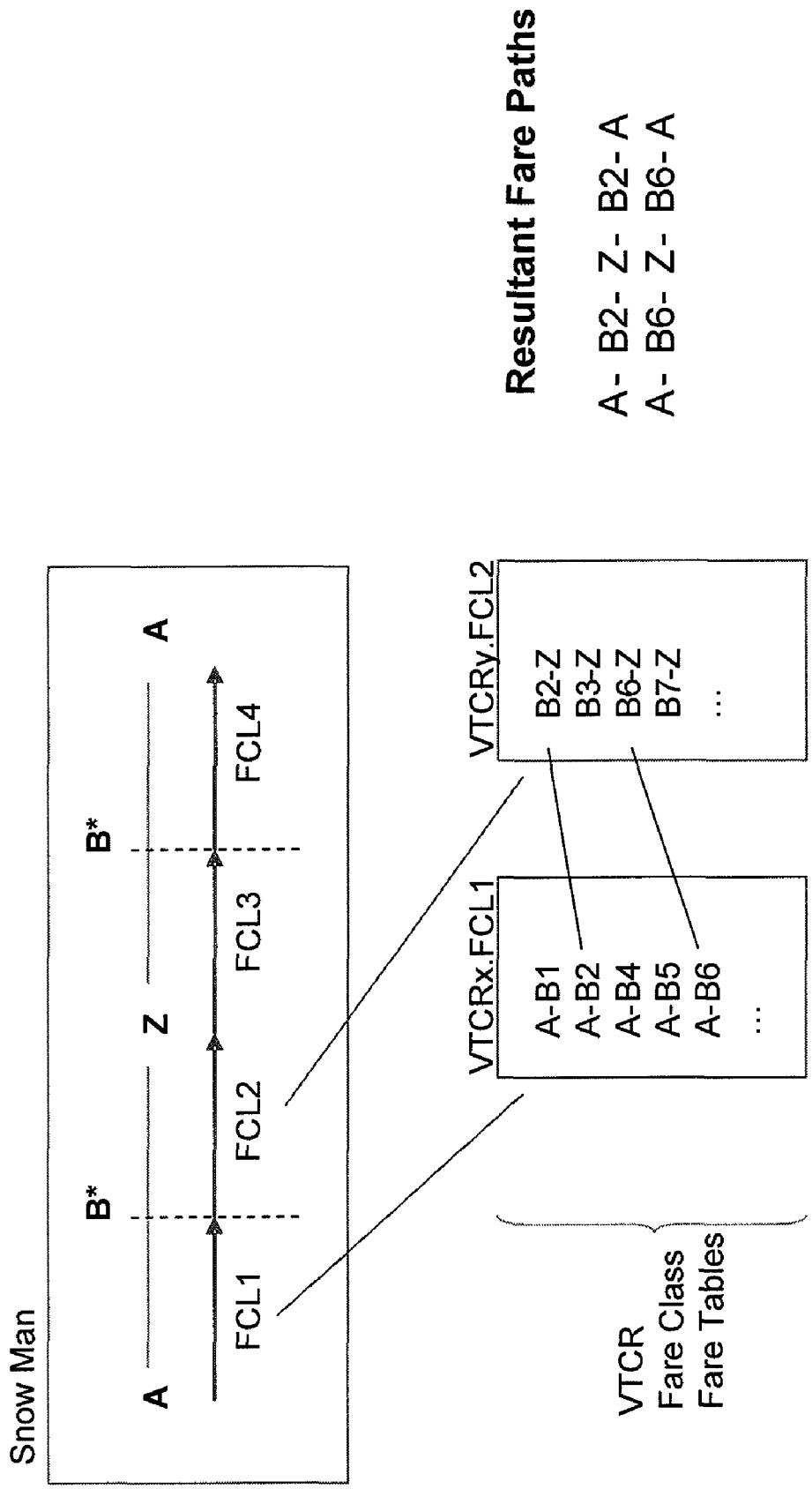
FIG. 11 depicts an exemplary solution pattern and combination of fare class tables according to an embodiment of the present invention.

In addition, the priority queue may then be expanded from the VTCR level to a VTCR/fare class combination level. In this regard, if the within pricing unit fare classes are combinable, end-on-end combinability is typically performed to validate the fare class combination as a whole. For the across pricing unit fare classes, the connection paths within the priority queue are prioritized to resolve the fare break points (i.e., points between connection paths) by joining the fare tables 18 associated with each valid fare class combination. Thus, the fare break points for each fare class combination for a given solution pattern can be determined by joining fare tables 18 for valid fare classes. With reference to FIG. 11, a snow man solution pattern is illustrated, where the break points (B*) between A-Z (i.e., O/D) are determined by joining fare tables 18. Each connection path (e.g., A-B2, B2-Z, Z-B2, and B2-A) includes an O/D pair and an associated fare. FIG. 11 demonstrates that within the fare table corresponding to VTCRx and FCL1 (i.e., fare class 1), the connection path A-B2 is combinable with the connection path B2-Z within the fare table corresponding to VTCRy and FCL2 due to the common midpoint B2. Thus, the exact midpoint or other additional point(s) between the requested O/D are not determined prior to generating connection paths, which is unlike conventional techniques that first determine midpoints.

Figure 12:
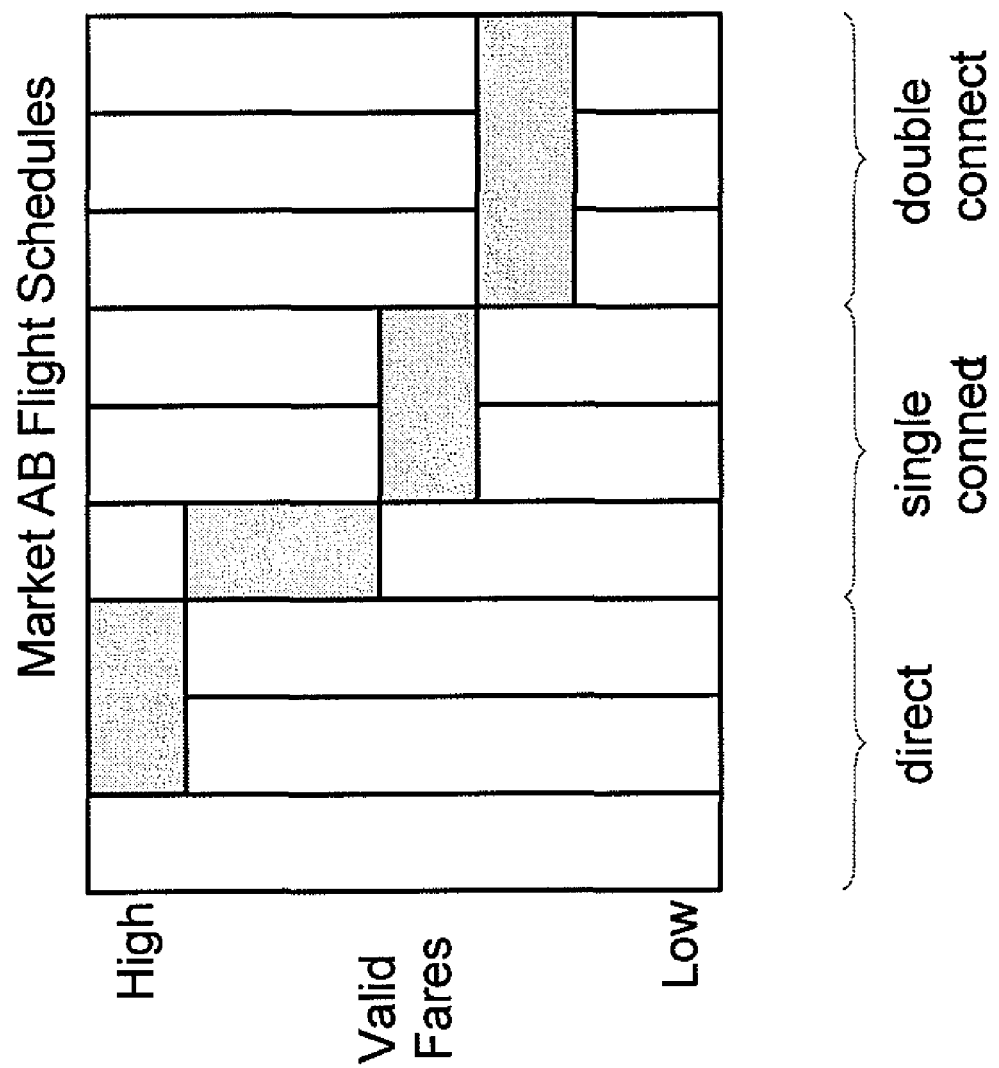
FIG. 12 illustrates a component table according to an embodiment of the present invention.

The priority queue may also be expanded from the VTCR/fare class combination level to an O/D level (i.e., fare path level). Thus, once the combinability of the connection paths for all pricing units is determined at the fare class level, fares for each market are grouped for all of the connection paths or fare paths (i.e., connection paths having an associated fare) generated by the solution pattern fare class combination priority queues. Thus, schedules and availability are determined for each of the connection paths. In particular, a dynamic schedule service may be employed to return schedules for connection paths having specified date ranges, and availability is requested for one or more markets (e.g., local and through markets). FIG. 12 illustrates a component table for a particular market, where available scheduled service is tabulated along with associated valid fares. Thus, for each connection path, availability information (e.g., direct and connection schedules) is collected, and additional validations for various journey selection criteria are performed for each of the valid fares. For example, routing, booking code, day-time application, flight application, transfers, stop over, and minimum fare checks may be performed. Once all constraints have been satisfied and scheduling verified for connecting schedules, complete itineraries are generated for each connection path or combination of connection paths based on the accumulated journey selection criteria. For instance, itineraries may be generated for each connection path and subsequent paths based on journey-level rules, while journey-level availability may be determined and itineraries created until one or more desired solutions are created or diversity rules determine that a sufficient number of itineraries have been created for a combination of connection paths. Connection paths that are sold out or produce desirable itineraries in the form of diversity or price may be eliminated, and if not enough itineraries are generated, additional connection paths may be created by further expanding the priority queue.

It is understood that the various features described above pertaining to the processes involved in generating one or more itineraries satisfying a user's request is not meant to be limiting. For example, various other steps could be performed, such as performing pricing unit based minimum fare checks and/or performing final journey validations including remaining minimum fare checks. In addition, the performance of the various steps may be carried out in different chronological steps. For instance, the combinability of the fare classes could be performed prior to or after the validation of fare classes within the rule tables. In addition, various steps could be performed concurrently, such as rule validation, fare path creation, component validation, final journey validation, and itinerary generation. Moreover, although the user's request typically includes a specific date pair request, the request could include other criteria, such as calendar shopping. In this regard, although combinability tends to be independent of temporal restrictions, many fare classes have temporal restrictions such as day-of-week and blackouts, such that tracking fare class validity over a range of dates may reduce the computational load.

Figure 13:
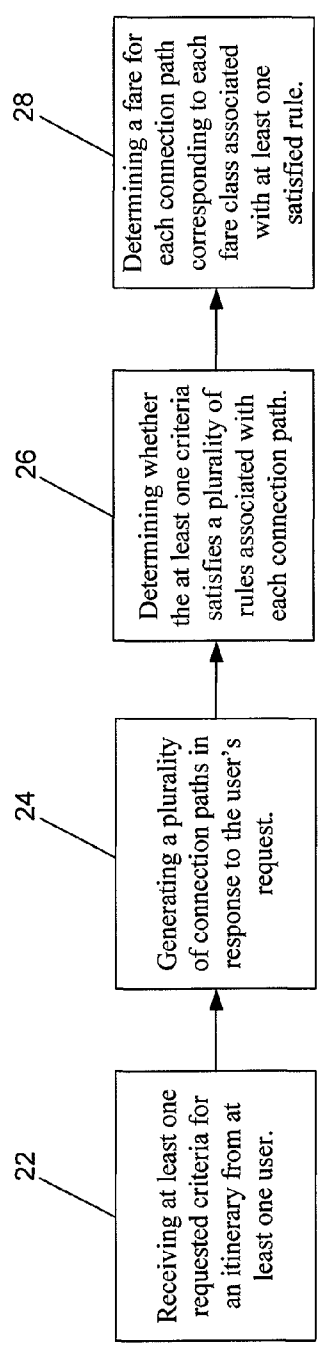
FIG. 13 is flowchart illustrating a process for generating an itinerary in response to a request from a user according to one embodiment of the present invention.

FIG. 13 illustrates an exemplary method for generating itineraries in response to a user's request according to one embodiment of the present invention. In particular, the method generally includes receiving a request from a user that contains one or more criteria, such as O/D and dates of travel (block 22). Connection paths satisfying the user's criteria are generated (block 24), and a comparison is made between the user's criteria and a plurality of rules associated with each connection path to determine whether the criteria satisfies the rules (block 26). In addition, a fare is determined for each connection path corresponding to each fare class associated with the satisfied rule(s) (block 28). Furthermore, one or more connection paths may be combined such that a combined fare may be determined, and complete itineraries may be generated and provided to the user.

Figure 14:
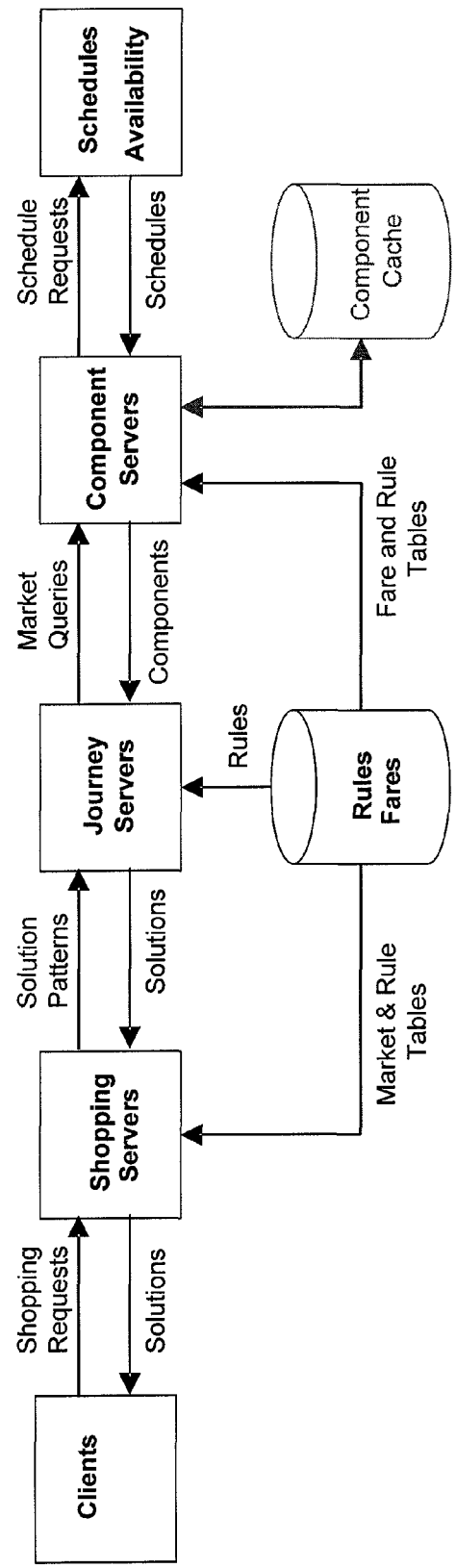
FIG. 14 illustrates a client-server network, according to one embodiment of the present invention.

With reference to FIGS. 2 and 14, exemplary system architecture for a client-server network for generating itineraries in response to requests from users is illustrated according to one embodiment of the present invention. As described above, a user submits a request via a client that includes one or more criteria, such as O/D and dates of travel. In response to the user's request, one or more servers, such as shopping servers, generate connection paths and identify VTCR's within the market table 14 that correspond to connection paths spanning the user's requested O/D. The system 10 may employ a shortest path algorithm driven by a weighted multi-dimensional objective function spanning scoring attributes such as mileage and service level in order to generate market paths that span the requested O/D. The generation of connection paths identifies potential fare break points and gateway city pairs (i.e., a flight segment between international airports). For example, a pre-defined mileage cap, number of layovers, and duration of layovers could be used to generate connection paths and eliminate those paths falling outside the pre-defined attributes within the market table 14.

The shopping servers also access the rule tables 16 based on the VTCR's identified and fare tables 18 for those fare classes corresponding to one or more satisfied category rules within the rule tables. The fare tables 18 are expanded for each valid fare class by computing constructed fares and process fare-by-rule VTCR's to establish discounts. Computing constructed fares is a process of determining what gateway-pair fares are used as a base and what add-on amount should be applied for the local segments. Using the set of solution patterns that have been pre-selected based on factors such as heuristics, experience, or choice, the shopping servers also generate a set of solution patterns based on the combinability of the connection paths within and across pricing unit types.

One or more additional servers, such as journey servers and component servers, may also be employed to facilitate the generation of itineraries. For example, journey servers may used to generate journey solutions from the solution patterns, request market components from the component servers, and perform all journey level validations. Thus, the journey servers may perform final journey level validation such as minimum fare checks and construct all the valid itineraries for a specific collection of fares. In addition, component servers could be used to generate valid market components and perform all component level validations.

According to one aspect of the present invention, the system generally operates under control of a computer program product. The computer program product for performing the methods of embodiments of the present invention includes a computer-readable storage medium, such as the memory device associated with a processing element, and computer-readable program code portions, such as a series of computer instructions, embodied in the computer-readable storage medium. In this regard, FIG. 13 is a control flow diagram of a method and program product according to one embodiment of the invention. It will be understood that each block or step of the control flow diagram, and combinations of blocks in the control flow diagram, can be implemented by computer program instructions. These computer program instructions may be loaded onto a processing element, such as a computer, server, or other programmable apparatus, to produce a machine, such that the instructions which execute on the processing element create means for implementing the functions specified in the block(s) or step(s) of the control flow diagram. These computer program instructions may also be stored in a computer-readable memory that can direct the processing element to function in a particular manner, such that the instructions stored in the computer-readable memory produce an article of manufacture including instruction means which implement the function specified in the block(s) or step(s) of the control flow diagram. The computer program instructions may also be loaded onto the processing element to cause a series of operational steps to be performed on the processing element to produce a computer implemented process such that the instructions which execute on the processing element provide steps for implementing the functions specified in the block(s) or step(s) of the control flow diagram.

Accordingly, blocks or steps of the control flow diagram support combinations of means for performing the specified functions, combinations of steps for performing the specified functions, and program instruction means for performing the specified functions. It will also be understood that each block or step of the control flow diagram, and combinations of blocks or steps in the control flow diagram, can be implemented by special purpose hardware-based computer systems which perform the specified functions or steps, or combinations of special purpose hardware and computer instructions.

Embodiments of the present invention may provide several advantages. In particular, the system of one embodiment of the present invention represents a shift in philosophy to provide a more efficient, extensible, and manageable air shopping capability across a variety of functional needs including domestic, international, alternate dates, alternate city, and calendar. For example, the system utilizes a staged reduction in the search space through the organization of rules, fare classes, fares, and schedule data. Using a rule-based approach such that only those connection paths that satisfy one or more category rules are further processed eliminates the need to initially determine itineraries or fares. Furthermore, by realizing that particular fare tables will never combine may eliminate a large number of fare combinations, while determining that two fare classes may not be combined may also eliminate a large number of fare combinations. As such, the system of one embodiment of the present invention may effectively minimize the total quantity of work required for each request, maximize the number of potential solutions, and raise the potential for overall quality responses. Moreover, the system of one embodiment of the present invention is flexible based on complex trips, alternate dates, alternate destinations, and calendar shopping. By initially building the rule and fare tables, a substantial portion of the processing is already completed rather than having to process the information for each request.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for generating an itinerary in response to a request from a user comprising:
   receiving at least one requested criteria for an itinerary from at least one user;
   generating a plurality of connection paths in response to the user's request;
   determining, by a processing element, whether the at least one criteria satisfies a plurality of rules associated with each connection path;
   determining the combinability of the connection paths for each of at least one fare class based at least in part on at least one combinability rule and in the absence of any information relating to a fare for the at least one connection path, an origin-destination for the at least one connection path, and scheduling for the at least one connection path; and
   determining a fare for each connection path corresponding to each fare class associated with at least one satisfied rule, wherein the at least one satisfied rule comprises at least one satisfied combinability rule.

2. The method of claim 1, further comprising identifying a plurality of rule identifiers corresponding to each connection path based on the at least one criteria.

3. The method of claim 2, wherein determining comprises determining whether the at least one criteria satisfies a plurality of rules associated with each connection path for each rule identifier.

4. The method of claim 1, wherein generating comprises generating at least one connection path using a shortest-path algorithm and a weighted multi-dimensional objective function.

5. The method of claim 1, further comprising combining a plurality of connection paths comprising a solution pattern of a sequence of pricing units, wherein each connection path is associated with a respective fare class.

6. The method of claim 5, further comprising generating a priority queue for a plurality of combinations of connection paths based on a respective score associated with each fare class.

7. The method of claim 6, further comprising determining a fare for each of the plurality of combinations of connection paths by combining a plurality of fare tables each associated with a respective fare class based on the scores within the priority queue.

8. The method of claim 7, further comprising accumulating journey selection criteria based on any remaining rules.

9. The method of claim 8, further comprising generating an itinerary for each of the plurality of combinations of connection paths based on the journey selection criteria.

10. The method of claim 5, wherein the combinability rules comprise category rules, and wherein determining the combinability comprises determining whether the pricing units are combinable based solely on category rules and associated fare classes.

11. The method of claim 1, wherein receiving comprises receiving at least one of origin, destination, and dates of travel from a user.

12. The method of claim 1, wherein each of determining whether the at least one criteria satisfies a plurality of rules associated with each connection path, determining the combinability of the connection paths for each of at least one fare class based at least in part on at least one combinability rule, and determining a fare for each connection path corresponding to each fare class associated with at least one satisfied rule is performed prior to determining scheduling and availability for the connection paths.

13. A non-transitory computer-readable medium containing instructions for controlling a computer system to perform a method for generating an itinerary in response to a request from a user comprising:
   receiving at least one requested criteria for an itinerary from at least one user;
   generating a plurality of connection paths in response to the user's request;
   determining whether the at least one criteria satisfies a plurality of rules associated with each connection path;
   determining the combinability of the connection paths for each of at least one fare class based at least in part on at least one combinability rule and in the absence of any information relating to a fare for the at least one connection path, an origin-destination for the at least one connection path, and scheduling for the at least one connection path; and
   determining a fare for each connection path corresponding to each fare class associated with at least one satisfied rule, wherein the at least one satisfied rule comprises at least one satisfied combinability rule.

14. The computer-readable medium of claim 13, further comprising identifying a plurality of rule identifiers corresponding to each connection path based on the at least one criteria.

15. The computer-readable medium of claim 14, wherein determining comprises determining whether the at least one criteria satisfies a plurality of rules associated with each connection path for each rule identifier.

16. The computer-readable medium of claim 13, wherein generating comprises generating at least one connection path using a shortest-path algorithm and a weighted multi-dimensional objective function.

17. The computer-readable medium of claim 13, further comprising combining a plurality of connection paths comprising a solution pattern of a sequence of pricing units, wherein each connection path is associated with a respective fare class.

18. The computer-readable medium of claim 17, further comprising generating a priority queue for a plurality of combinations of connection paths based on a respective score associated with each fare class.

19. The computer-readable medium of claim 18, further comprising determining a fare for each of the plurality of combinations of connection paths by combining a plurality of fare tables each associated with a respective fare class based on the scores within the priority queue.

20. The computer-readable medium of claim 19, further comprising accumulating journey selection criteria based on any remaining rules.

21. The computer-readable medium of claim 20, further comprising generating an itinerary for each of the plurality of combinations of connection paths based on the journey selection criteria.

22. The computer-readable medium of claim 13, wherein receiving comprises receiving at least one of origin, destination, and dates of travel from a user.

23. A system for generating an itinerary in response to a request from a user comprising at least one processing element, the at least one processing element configured to:
receive at least one requested criteria for an itinerary from at least one user;
generate a plurality of connection paths in response to the user's request;
determine whether the at least one criteria satisfies a plurality of rules associated with each connection path;
determine the combinability of the connection paths for each of at least one fare class based at least in part on at least one combinability rule and in the absence of any information relating to a fare for the at least one connection path, an origin-destination for the at least one connection path, and scheduling for the at least one connection path; and
determine a fare for each connection path corresponding to each fare class associated with at least one satisfied rule, wherein the at least one satisfied rule comprises at least one satisfied combinability rule.

24. The system of claim 23, wherein the at least one processing element is further configured to identify a plurality of rule identifiers corresponding to each connection path based on the at least one criteria.

25. The system of claim 24, wherein the at least one processing element is further configured to determine whether the at least one criteria satisfies a plurality of rules associated with each connection path for each rule identifier.

26. The system of claim 23, wherein the at least one processing element is configured to generate the plurality of connection paths at least in part by generating at least one connection path using a shortest-path algorithm and a weighted multi-dimensional objective function.

27. The system of claim 23, wherein the at least one processing element is further configured to combine a plurality of connection paths comprising a solution pattern of a sequence of pricing units, wherein each connection path is associated with a respective fare class.

28. The system of claim 27, wherein the at least one processing element is configured to determine whether the at least one criteria satisfies the plurality of rules associated with each connection path at least in part by determining the combinability of the connection paths for each fare class based at least in part on the at least one combinability rule.

29. The system of claim 27, wherein the at least one processing element is further configured to generate a priority queue for a plurality of combinations of connection paths based on a respective score associated with each fare class.

30. The system of claim 29, wherein the at least one processing element is further configured to determine a fare for each of the plurality of combinations of connection paths by combining a plurality of fare tables each associated with a respective fare class based on the scores within the priority queue.

31. The system of claim 23, wherein the received at least one requested criteria comprises at least one of origin, destination, and dates of travel.

32. The system of claim 23, wherein the at least one processing element is configured to determine whether the at least one criteria satisfies a plurality of rules associated with each connection path, determine the combinability of the connection paths for each of at least one fare class based at least in part on at least one combinability rule, and determine a fare for each connection path corresponding to each fare class associated with at least one satisfied rule prior to determining scheduling and availability for the connection paths.

* * * * *